Figure 1:
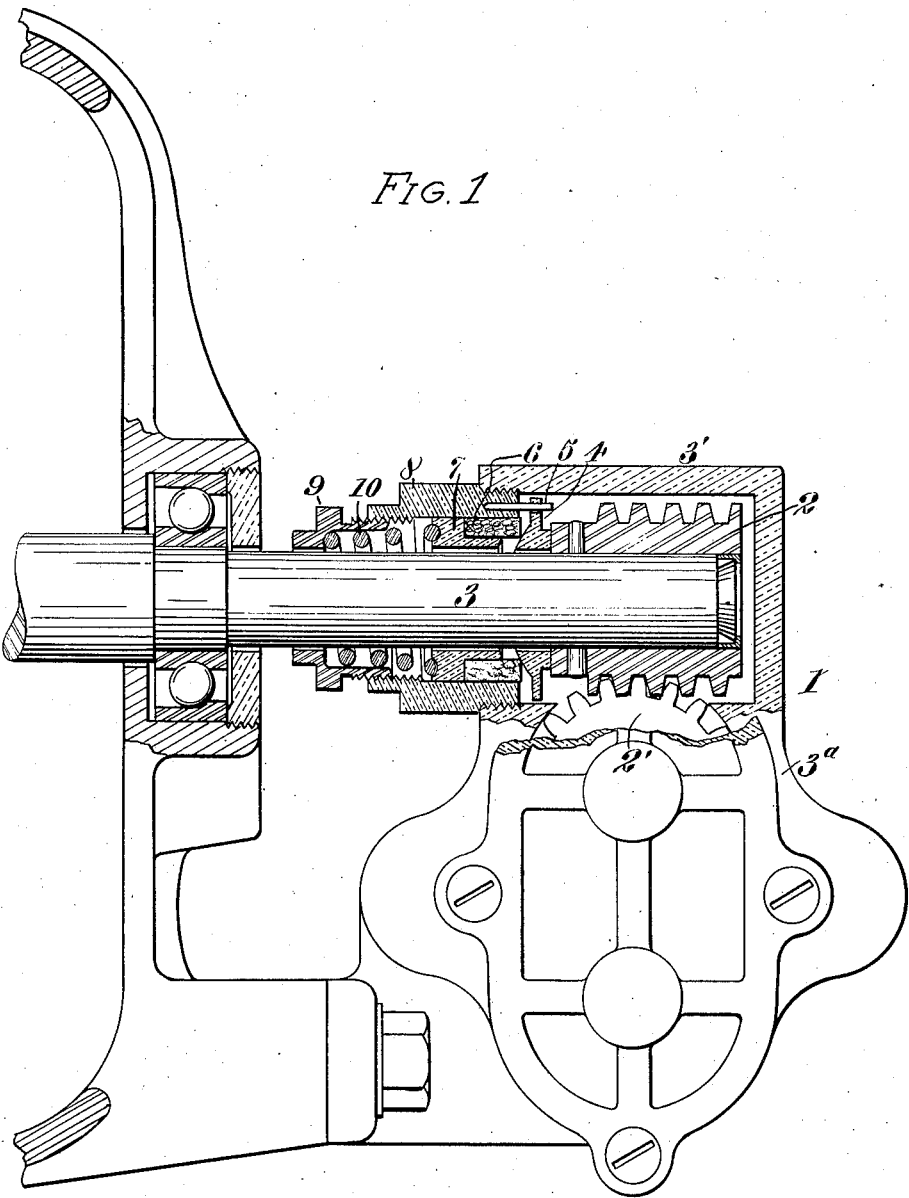

Mar. 3, 1925.

B. W. HURD 1,528,334

PACKING GLAND

Filed Jan. 12, 1924

INVENTOR.
B. W. Hurd
BY
his ATTORNEYS.

Patented Mar. 3, 1925.

1,528,334

UNITED STATES PATENT OFFICE.

BENJAMIN W. HURD, OF SAN FRANCISCO, CALIFORNIA, ASSIGNOR TO TURBINE FUEL OIL BURNER CO., OF SAN FRANCISCO, CALIFORNIA, A CORPORATION OF NEVADA.

PACKING GLAND.

Application filed January 12, 1924. Serial No. 685,867.

*To all whom it may concern:*

Be it known that I, BENJAMIN W. HURD, a citizen of the United States, residing at the city and county of San Francisco and State of California, have invented certain new and useful Improvements in Packing Glands, of which the following is a specification.

The present invention comprises a packing gland for use in connection with pumps generally, but more particularly those employed in connection with the supplying of oil to oil burners, the design of the gland being such as to take up the wear of the moving parts without creating undue friction, heating of the moving parts, or the putting or placing of an unnecessary load on the power plant; the object of the invention being to furnish a floating seal for preventing the escape of fluid or gases between the parts to be packed, which at all times is held under sufficient pressure to maintain a tight joint connection with the immovable portion of the gland structure.

Usually the sealing medium in packing glands designed to prevent the escape of fluid or gases, takes the form of compressing a fiber or metal packing around the moving shaft for the purpose of taking up wear, but if such packing medium is not adjusted by a competent person undue friction will be produced, causing the heating of the moving parts and placing an unnecessary load on the power plant and it is these objections to the present type of packing gland which the hereinafter described invention successfully disposes of.

To comprehend the invention, reference should be had to the accompanying sheet of drawings wherein is illustrated a broken sectional view of a pumping apparatus with the invention applied thereto.

In the drawings the numeral 1 designates the pump of the apparatus and 2 a worm pinned to a shaft 3, the worm 2 meshing with the worm gear 2' of the pump mechanism. The end of the shaft 3 to which the worm 2 is pinned extends within a chamber formed by a housing 3' which constitutes an extension of the motor casing 3ª. Embracing the shaft 3 and situated in advance of the worm 2 is a sealing disk 4, said disk being held against rotation by means of the pins 5 which connect with the gland body member. The disk 4 coacts with a seat and seal forming washer 6 composed of a suitable fluid-proof material, said washer being held or retained on a follower 7 loosely mounted upon the shaft 3 and slidably held within the gland body member 8. Surrounding the shaft 3 in advance of the follower 7 is a spring 10, which is held in position and under proper tension by means of a gland nut 9 loosely mounted upon the shaft 3 and the threaded extension of which screws into the threaded end of the gland body member 8, which body member in turn is screwed into the casing section 3' of the casing 3ª.

The member to be sealed against the escape of fluid or gas is the chamber of the casing extension 3' and the sealing of which is accompanied by screwing up the gland nut 9 to force inwardly and maintain under sufficient pressure the spring 10 to cause the follower 7 to move inwardly and be held inwardly such a distance as to place the seat and seal forming washer 6 firmly against the outer face of the longitudinally movable sealing disk 4, which under the pressure brought to bear thereon is maintained firmly due to the convexity of its rear face against the face of the worm 2. The sealing disk 4 is thus at all times held and maintained under spring pressure against the face of the rotating worm 2. Due to the convexity of the rear face of the disk 4, the worm 2 can move as the bearings wear and this without destroying the fluid and gas-tight seal formed by the seal disk 4 under the tension of the spring 10, the tension of which can be regulated and increased merely by screwing up the gland nut 9.

The seal 4 is a floating one and may be considered as the non-rotatable member of the gland structure against which the moving movable sealing members are held at all times by the pressure of the spring 10, the moving members of the gland structure comprising the longitudinally movable spring held follower 7 with its seat and seal forming member 6 formed of fluid-proof material which acts against the rear surface of the disk 4, together with the tension spring 10 and the adjusting nut 9. The member 6 to all intents and purposes constitutes a sealing and packing washer.

The application of the packing gland is as follows:

The parts being arranged relative to the shaft 3, the gland body member 8 is screwed into or otherwise fastened to the member 3' to be sealed. The nut 9 working in the gland body member 8 is then screwed up to compress the spring 10 against the follower 7, forcing the same inwardly to place its packing member 6 firmly against the convex face of the sealing disk 4. The pressure thus applied firmly places the sealing device 4 against the face of the worm 2, leaving the worm free to rotate with the shaft 3. As wear takes place, the worm will give thereto, but due to the convexity of the rear face surface of the sealing disk 4 the seal will at all times be maintained.

It will be noted that the inner face of the sealing disk 4 conforms to the outer face of the worm 2 against which the disk 5 seats and forms a seal union and due to these surfaces conforming one with the other the worm 2 is permitted to move under irregular strains placed thereon by the rotating shaft 3 to which it is pinned and this without destroying the seal made therewith by the disk 4 or in other words, there is permitted slight sliding movement to exist between the said worm and the sealing disk 4. Inasmuch as the outer face of the sealing disk 4 is formed convex, it is apparent that the same may have or may give to a slight rocking action relative to the seat and seal forming member 6 and this without destroying the seal formed between the said members. There is slight longitudinal movement or give permitted or provided for by the seat and seal forming member 6, by reason of the fact that the same is mounted on and carried by the spring held follower 7 and said member 6 is at all times held under sealing pressure against the convex face of the disk 4 and which disk as heretofore explained, is connected to the gland body member 18 through the medium of pins 5 which pass through apertures formed in the flange portion of the disk 4, the disk thus being held locked as against rotative movement but free to move longitudinally to take up or compensate for wear which takes place between the inner face of the said disk 4 and the outer face of the worm 2.

Having thus described my invention, what I claim as new and desire to secure by Letters Patent, is:

In combination with a housing having a shaft opening, a driven shaft extending through the opening and rotatably mounted within the housing and having a shoulder, a sealing disk loosely mounted on the shaft within the housing and having an inner face conforming to the face of the shoulder with which it coacts and having a convex outer face, a gland body member surrounding the shaft and threaded into the housing shaft opening, a tubular follower slidably mounted on the shaft within the gland and formed at one end with a circumferential recess, a seat and seal forming washer within the recess and projecting beyond the end of the follower for engagement at its inner peripheral edge with the convex face of the disk, a gland nut threaded into the gland body, a thrust spring coiling about the shaft and bearing against the follower, and a connection between the gland and disk whereby the latter is held from rotation with the shaft.

In testimony whereof I have signed my name to this specification.

BENJAMIN W. HURD.